June 30, 1936.   W. J. BELCHER   2,045,565
ENCLOSURE FOR FLEXIBLE CONNECTIONS
Filed Sept. 21, 1933   2 Sheets-Sheet 1
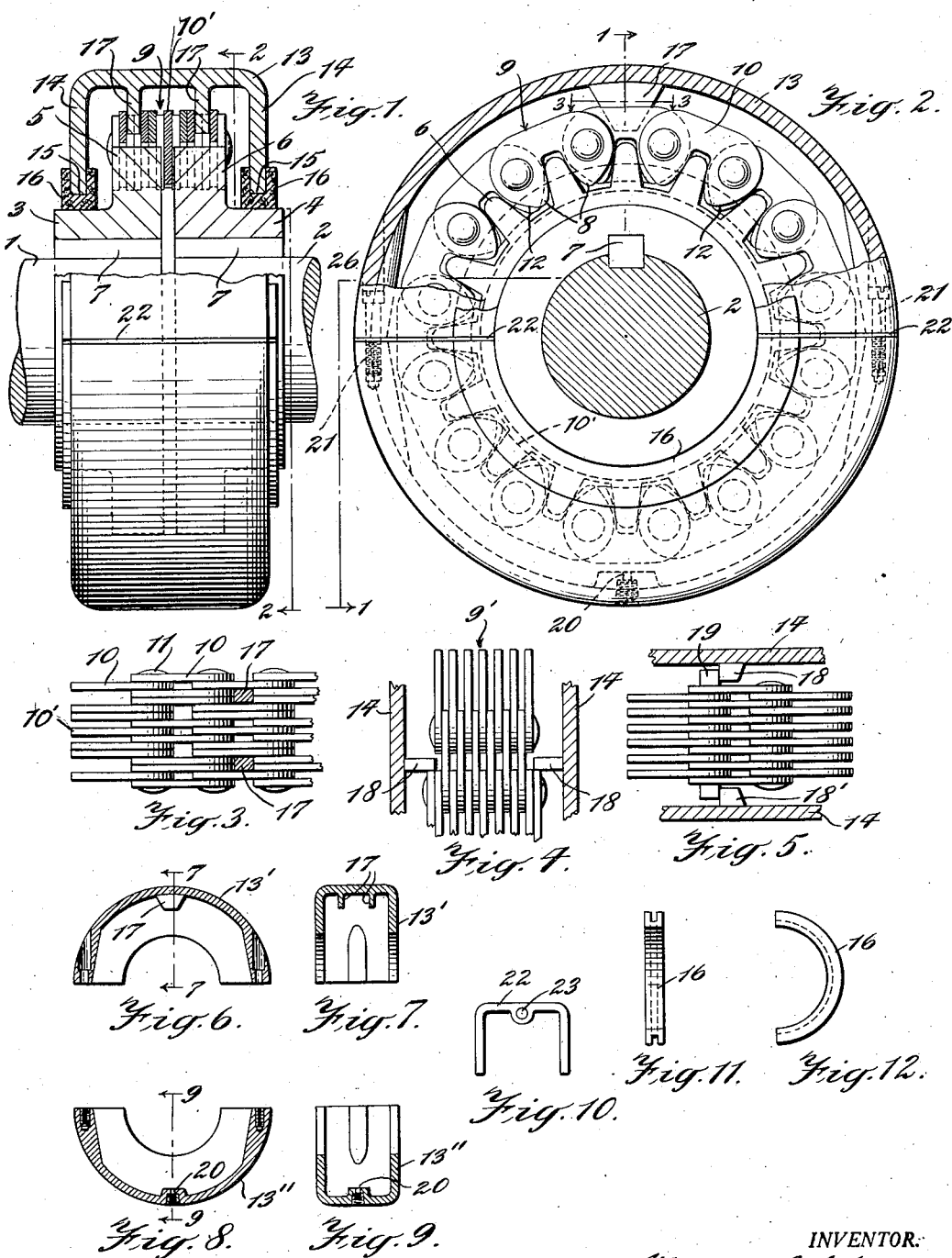
INVENTOR.
Warren J. Belcher,
BY
Gifford, Scull & Burgess
ATTORNEYS.

June 30, 1936.   W. J. BELCHER   2,045,565
ENCLOSURE FOR FLEXIBLE CONNECTIONS
Filed Sept. 21, 1933   2 Sheets-Sheet 2

INVENTOR.
Warren J. Belcher
BY
Gifford, Scull & Burgess
ATTORNEYS.

Patented June 30, 1936

2,045,565

UNITED STATES PATENT OFFICE 2,045,565

ENCLOSURE FOR FLEXIBLE CONNECTIONS

Warren J. Belcher, West Hartford, Conn., assignor to The Whitney Chain & Mfg. Company, Hartford, Conn., a corporation of Connecticut Application September 21, 1933, Serial No. 690,337

2 Claims. (Cl. 64—19)

This invention relates to a novel and improved enclosure for flexible connections, particularly of the type of connection involving the use of a chain to connect the ends of adjacent shafts. The accompanying drawings show selected embodiments of the invention, and referring thereto:

Fig. 1 is a side elevation of the enclosure, parts being broken away and parts being in section, and the enclosure being shown as applied to adjacent shaft ends. This view is taken substantially on the line 1—1 of Fig. 2;

Fig. 2 is a view taken substantially on the line 2—2 of Fig. 1;

Fig. 3 is a view taken substantially on the line 3—3 of Fig. 2 but on a different scale;

Figs. 4 and 5 are views corresponding to Fig. 3 but showing different forms of the detail appearing in Fig. 3;

Figure 13:
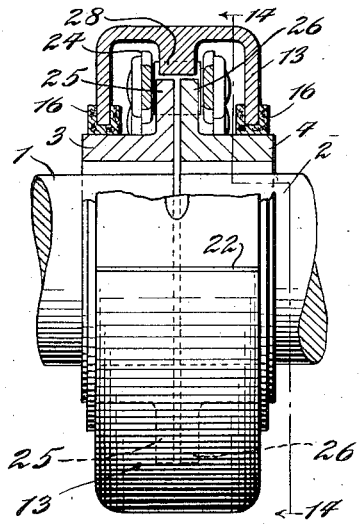
Figure 14:
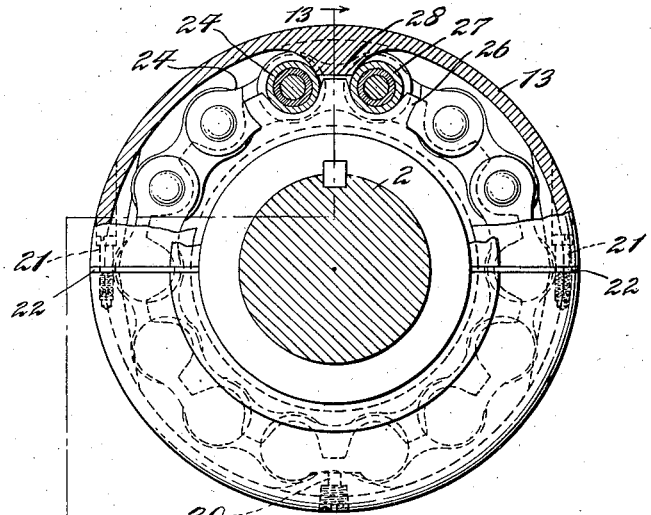
Figure 17:
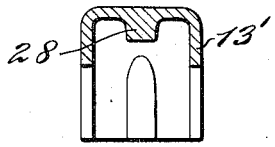
Figure 15:
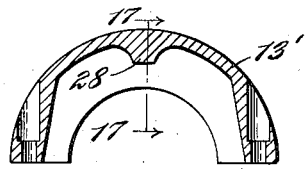
Figure 18:
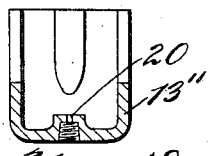
Figure 16:
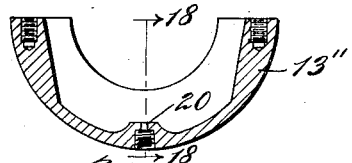

Figs. 6, 7, 8, and 9 are views showing the details of the casing forming part of the enclosure, Figs. 7 and 9 being taken on the lines 7—7 and 9—9, respectively, of Figs. 6 and 8;

Fig. 10 is a detail view of one of the gaskets used in assembling the parts shown in Figs. 6, 7, 8, and 9;

Figs. 11 and 12 are views taken at right angles to each other and showing one of the parts of the lubricant retainer;

Fig. 13 is a view similar to Fig. 1 but showing a slightly different form of the invention, this view being taken on the line 13—13 of Fig. 14;

Fig. 14 is a view taken substantially on the line 14—14 of Fig. 13;

Figs. 15, 16, 17, and 18 are views showing the enclosure of Figs. 13 and 14, Figs. 17 and 18 being taken respectively on the lines 17—17 and 18—18 of Figs. 15 and 16.

Referring first to Figs. 1 and 2, I have shown therein two shafts 1 and 2 having their ends adjacent and facing each other and provided with a flexible driving connection therebetween. In this embodiment, the connection consists of gear teeth carried by the respective shafts and meshing with teeth on a continuous chain of the so-called "silent" type, which is movable lengthwise of the shafts to some extent. The shaft 1 is shown as provided with a hub 3, and the shaft 2 with a similar hub 4, the hub 3 carrying teeth 5 and the hub 4 carrying teeth 6. These teeth extend radially outwardly from the shafts 1 and 2, and the hubs are keyed to the shafts as by keys 7. The teeth form driving members, and they in turn engage with the teeth 8 of the chain 9. The chain is, as mentioned above, of the silent type, formed of a plurality of plates 10 connected by rivets or pins 11 passing through aligned holes in overlapping ends of the plates, and each plate is provided with a pair of inwardly extending teeth 8. The chain is of sufficient width, as plainly shown in Fig. 1, to engage the teeth 5 and 6 on the respective hubs so as to complete the driving connection between these two hubs and consequently between the two shafts. Movement of the chain lengthwise of the shafts may be limited by a guide plate 10', here shown as a center guide disposed between the ends of the shafts, although the well-known side guides could be used if that type of chain is employed.

In accordance with one feature of the invention, I employ a stretch of chain which is not only continuous so as to completely surround the shaft ends, but which is so designed that the teeth 8 have internal engagement only with the teeth disposed therebetween. That is to say, the back edge 12 of any tooth is out of engagement with the adjacent gear tooth on the hub. This arrangement materially decreases the friction between the chain and the teeth on the hub and provides a more flexible connection.

Surrounding the shaft ends and the connection therebetween is an enclosure, here shown as a casing 13, having side walls 14 extending radially with respect to the shafts and having their innermost edges 15 received in U-shaped lubricant retainers 16. These retainers are preferably of flexible material which is substantially impervious to oil or other lubricant that may be put within the casing and, as shown in Figs. 11 and 12, they may conveniently be formed in two semi-circular arc-shaped members, the ends of which may abut to completely surround the hubs 3 and 4 and bear thereon. These retainers thus form bearings for the casing against the shaft, of which, of course, the hubs form functional parts. That is to say, the retainers not only act to retain the lubricant within the casing, but they also act as bearings to support the casings on the shafts.

I preferably provide the casing with inwardly extending lugs or other elements 17 adapted to engage elements on the chain. In the form shown in Figs. 1, 2, and 3, the chain has the plates 10 so arranged that in each pitch extending across the chain there is mounted, first, a single plate and then two plates together. The result is the formation of openings in which the lugs 17 may conveniently be placed and engage the backs of the plates on either side thereof.

The above arrangement has several advantages, among which may be mentioned elimination of friction between the casing and the hubs

3 and 4, in that there is substantially no circumferential rotation therebetween.

In Fig. 4 I have shown an arrangement in which the chain 9' has each pitch formed entirely of single plates, and in this form the engagement with the casing and the chain may conveniently be had by providing lugs 18 extending inwardly from the side walls 14 of the casing.

In Fig. 5 is an arrangement closely similar to that of Fig. 4, except that here the lugs 18' engage extended ends 19 of the rivets, these extended ends being provided for that purpose.

Referring now to Figs. 6, 7, 8, and 9, it will be seen that the casing may be made in two parts 13' and 13", with the bosses 17 cast integral with one of the parts, in this instance with the part 13'. The lower part 13" may be provided with an opening 20 through which lubricant may be forced into the casing after the casing is installed and which may then be closed by a threaded plug in a manner well known in the art. The two parts may also be provided with aligned openings, as indicated, for the reception of screws 21 (Fig. 2).

When the two parts 13' and 13" are fastened together, I provide two gaskets 22, one on either side of the shafts, these gaskets being provided with holes 23 to receive the screws 21. The casing is thus made substantially continuous, and with the retainers 16 a tight enclosure is formed for the lubricant. This lubricant may, of course, be renewed at any time, either by draining through the opening 20 or by removing the casing.

In Figs. 13 and 14 I have shown a slightly different form of the invention, and in these figures the same reference characters will be used to indicate elements which are not materially different from those shown in Figs. 1 and 2. The description of such parts will not be repeated.

The principal difference of the construction shown in Figs. 13 and 14 over what is shown in Figs. 1 and 2 is that here a roller type of chain 24 is used in place of the silent type previously described. The hubs 3 and 4 are provided with teeth 25 and 26 so shaped as to mesh with the rollers 27 of that type of chain. The casing in this instance is provided with a single relatively heavy lug 28 which fits between two adjacent rollers 27 and which will thus cause the casing to rotate with the shafts and with the connection formed by the chain and teeth on the hubs.

It will be seen that when using either form of chain, and no matter what may be the specific arrangement of the lug engaging the chain, that lug extends from the casing towards the chain and has a surface which contacts with a surface on some chain member, such as link, roller, or rivet pin, along a surface generally parallel to the surface on the lug. These contacting surfaces extend lengthwise of the shafts and also extend toward the shafts so that there may be sliding movement between the surface on a lug and the surface on a chain member both lengthwise of the shafts and transversely thereof.

In each embodiment shown, it will be seen that the casing is supported by the shafts but that it is caused to rotate by engagement with the flexible driving connection. The two shafts may be materially out of line with each other without disturbing the casing in its relation to the other parts to a sufficient extent to permit the leakage of lubricant. The flexible driving connection shown is one in which the two shafts may occupy various angular positions with respect to each other and may also be displaced so that, while approximately parallel to each other, they are still out of line. No matter what the displacement may be, either angular or otherwise, the casing is caused to rotate by engagement of the elements on the casing and connection, respectively, and it will be seen that these elements will engage even though there should be some displacement of the connection laterally or transversely of the shafts.

By this positive engagement between the connection and the casing, much friction between the hubs 3 and 4 and the lubricant retainers is eliminated and thus these retainers remain tight for a much longer period than would be the case if they were relied upon to form a driving connection between the hubs and the casing, to cause the casing to rotate with the shafts. In this connection, it should be noted that, since the invention is for use where two shafts may be expected to be out of alignment, the wear on the retainers is such that they would become so loose that they would permit the casing to ride loosely on the hub and not rotate therewith. All these difficulties are overcome by the invention described above.

While I have shown the invention as embodied in specific forms, it is to be undersood that various changes in details may be made without departing from the scope of the invention, and I therefore do not intend to limit myself except by the appended claims.

I claim:

1. In combination, two shafts in approximate alinement with each other and having ends adjacent each other, a flexible driving connection between said shafts permitting a limited misalinement therebetween, said connection comprising outwardly extending teeth on each of said ends and a continuous chain having spaced members extending lengthwise of the shafts and engaging said teeth and having limited movement with respect thereto lengthwise of said shafts, a lubricant-receiving casing surrounding said connection and having walls extending inwardly towards said shafts on opposite sides of said connection, a lubricant retainer of flexible material disposed between the inner edge of each of said walls and the adjacent shaft and preventing the escape of lubricant from the casing, said casing being supported on said shafts entirely by said retainers, and an element on said casing and extending inwardly from the casing between said chain members and into engagement with one or more of them and slidable with respect thereto lengthwise and transversely of the shafts as the shafts vary their relation to each other, but positively rotating said casing with the shafts.

2. In combination, two shafts in approximate alinement with each other and having ends adjacent each other, a flexible driving connection between said shafts permitting a limited misalinement therebetween, said connection comprising outwardly extending teeth on each of said ends and a continuous chain having members with surfaces extending toward said shafts and lengthwise thereof, such surfaces on certain chain members engaging said teeth and having limited movement with respect thereto lengthwise of said shafts, a lubricant-receiving casing surrounding said connection and having walls extending inwardly towards said shafts on opposite sides of said connection, a lubricant retainer of flexible material disposed between the inner edge of each of said walls and the adjacent shafts and preventing the escape of lubricant from the casing, said casing being supported on said shafts entirely by said retainers, and an element on said casing and extending from the casing towards said chain and having a surface in contact with one of said surfaces on a chain member and slidable with respect thereto lengthwise and transversely of the shafts as the shafts vary their relation to each other, but positively rotating said casing with the shafts.

WARREN J. BELCHER.